(No Model.) 2 Sheets—Sheet 1.
J. W. HEWITT.
TWO WHEELED VEHICLE.
No. 482,739. Patented Sept. 20, 1892.
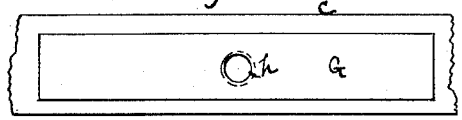
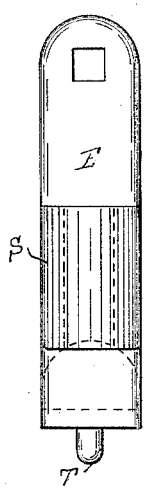
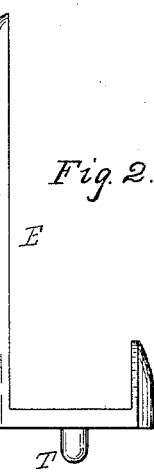
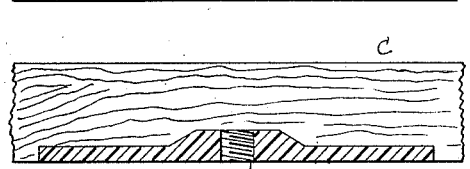
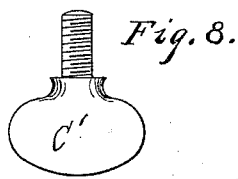
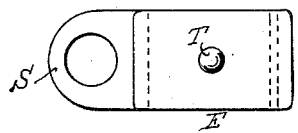
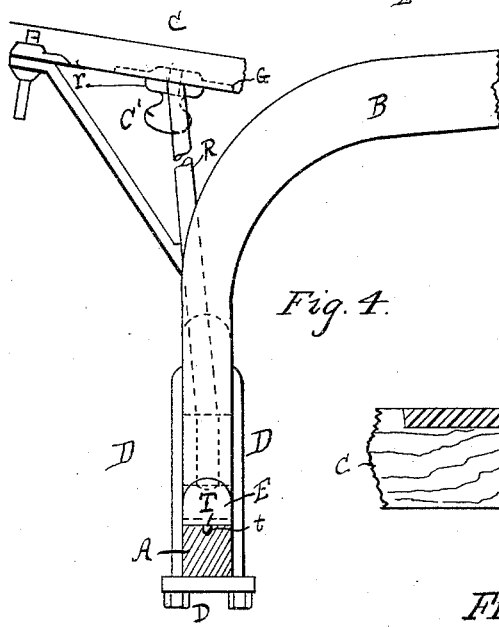
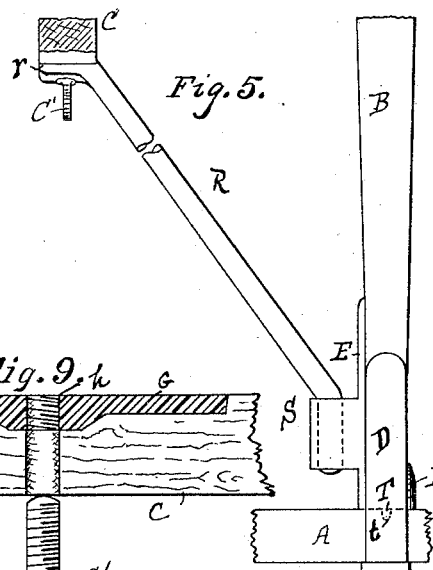
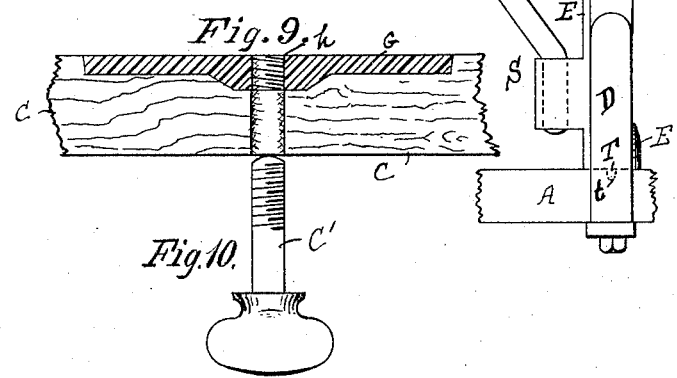
Witnesses—
Alice L. Higgs
Alexander Brown
Inventor—
Jackson W. Hurst
by Elliott Stoddard
his Attorney

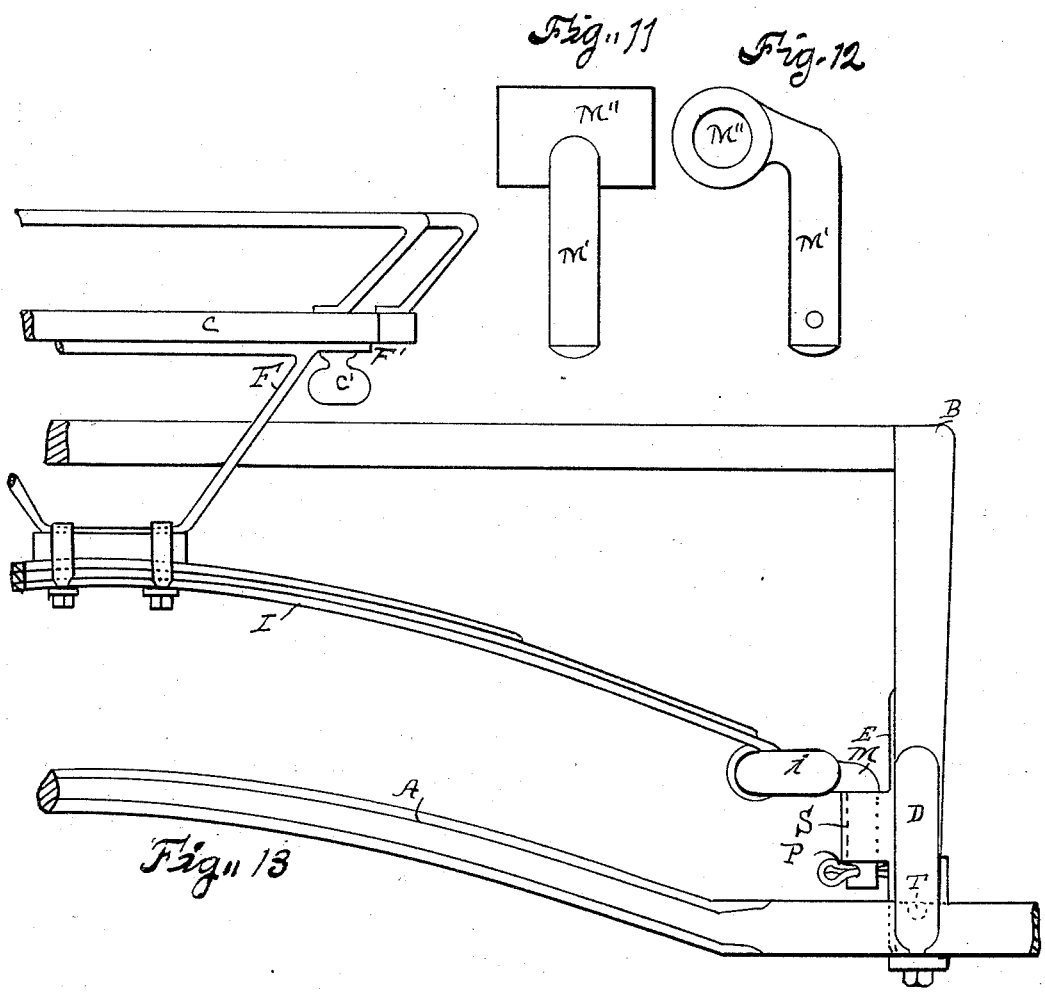

UNITED STATES PATENT OFFICE.

JACKSON W. HEWITT, OF JACKSON, MICHIGAN.

TWO-WHEELED VEHICLE.

SPECIFICATION forming part of Letters Patent No. 482,739, dated September 20, 1892.

Application filed March 26, 1892. Serial No. 426,473. (No model.)

*To all whom it may concern:*

Be it known that I, JACKSON W. HEWITT, of Jackson, in the county of Jackson and State of Michigan, have invented a new and useful Improvement in Two-Wheeled Vehicles, of which the following is a specification.

My invention relates to two-wheeled vehicles; and the object of my improvement is to adapt a vehicle to be used as a sulky or as a road-cart. I attain this object in the apparatus illustrated in the accompanying drawings, in which—

Figure 1 is an elevation of the socket-iron. Fig. 2 is a side elevation, and Fig. 3 a bottom plan view, of the same. Fig. 4 is a side elevation, and Fig. 5 a rear elevation, of a portion of a vehicle embodying my invention when adapted to be used as a sulky. Figs. 6, 7, and 8 are detail views of the parts used in securing the seat-supporting apparatus to the seat. Figs. 9 and 10 are detail views showing an alternative construction of the parts shown in Figs. 6, 7, and 8. Figs. 11 and 12 are detail views of the part used to connect the spring to the running-gear when the vehicle is to be used as a road-cart, and Fig. 13 is a rear elevation of a vehicle embodying my invention when adapted to be used as a road-cart.

The same reference-letters refer to the same parts throughout the several views.

A is the axle, B the shafts, and C the seat, of a two-wheeled vehicle.

D D are the clips by which the shafts B are secured to the axle A.

E is an L-shaped iron provided with a socket S upon the outside of its longer leg and with a stud T projecting from the under side of its shorter leg.

The axle A is provided with indentations *t*, Fig. 4, adapted to receive the studs T at that part of the axle which is directly below the ends of the shafts when the shafts are secured in place. The socket-iron T is secured in place by placing the end of the shaft between its legs and bolting the iron to the shaft. The studs T are then placed in the indentations *t*, and the shafts, and therefore the socket-irons E, are bound firmly in place by the clips D in the usual manner.

G is the metal plate, set into and secured to the seat C and provided with a screw-threaded aperture *h* at its center. C' is a thumb-screw provided with threads adapted to engage with the threads of the aperture *h*. The plate G is secured to the seat near its side and about midway between its front and back and at the lower surface of said seat, as shown in Fig. 7, or at the upper surface, as shown in Fig. 9.

R is a metal rod bent at its lower end, as shown in Fig. 5, so as to pass vertically into the socket S and so that its upper end shall come beneath the plate G on the seat.

*r* is a horizontal lug or ear formed at the upper end of the rod R and provided with an aperture at its center, through which the shank of the thumb-screw C' may pass.

When the vehicle is to be used as a road-cart, the seat-supporting apparatus shown in Figs. 11, 12, and 13 is employed. Said apparatus consists of a seat-bracket F of the usual construction, except that it is provided with lugs or ears F' at its side and top, having the same construction as the lugs *r*, and a spring I of the usual construction and secured to the seat-bracket in the usual way.

The spring I is connected at its ends by a swinging link *i* with irons M, having the construction shown in Figs. 11 and 12. Referring to said figures, M' is a shank adapted to fit into and pass through the socket S. P is a split key adapted to prevent the accidental removal of the iron from the socket S. M'' is a head provided with an aperture for receiving the bolt, which retains one end of the swinging link *i* in place.

The construction of the seat-supporting apparatus upon one side of the vehicle has alone been described, as the construction upon both sides is precisely the same.

When the vehicle is to be used as a road-cart, the spring is secured in place by placing the irons M in the sockets S and fastening the bracket F to the seat by the thumb-screws C', passing through an aperture in the centers of the lugs or ears F' and up into the plate G on the seat, as shown in Fig. 13.

When the vehicle is to be used as a sulky, the spring and bracket are removed, the irons R are placed in the sockets S, and their upper ends secured to the seat by the thumb-screws C'.

Having fully described my invention, what

I claim, and desire to secure by Letters Patent, is—

1. A two-wheeled vehicle provided with sockets S, secured to the running-gear thereof, and a spring I, provided at its ends with irons M, adapted to fit into said sockets, said spring being adapted to be detachably clamped to the seat of said vehicle, said vehicle being provided with a rod or rods R, adapted to fit into said sockets and to be clamped to said seat, substantially as shown, and for the purpose set forth.

2. In a two-wheeled vehicle provided with a screw-threaded aperture or apertures $h$ upon the seat thereof and provided with sockets S upon the running-gear thereof, a spring I, provided with irons M at the ends thereof, said irons being adapted to fit into said sockets, said spring being provided with a lug or lugs F′, said lugs having apertures through them, a rod or rods R, adapted to fit into said sockets and provided with lugs $r$, similar to lugs F′, and thumb-screws C′, substantially as and for the purpose set forth.

3. A two-wheeled vehicle provided with sockets S, secured to the running-gear thereof, and a spring I, provided at its ends with irons M, adapted to fit into said sockets, said spring being adapted to be detachably secured to the seat of said vehicle, substantially as and for the purpose described.

JACKSON W. HEWITT.

Witnesses:
JOSIAH B. FROST,
CHARLES M. FROST.